(12) United States Patent
Benedek et al.

(10) Patent No.: US 11,787,720 B2
(45) Date of Patent: Oct. 17, 2023

(54) ANAEROBIC DIGESTION OF ORGANIC FRACTION OF SOLID WASTE WITH HIGH QUALITY DIGESTATE

(71) Applicant: ANAERGIA INC., Burlington (CA)

(72) Inventors: Andrew Benedek, Rancho Santa Fe, CA (US); Juan Carlos Josse, Aliso Viejo, CA (US)

(73) Assignee: ANAERGIA INC., Burlington (CA)

( * ) Notice: Subject to any disclaimer, the term of this patent is extended or adjusted under 35 U.S.C. 154(b) by 447 days.

(21) Appl. No.: 16/966,569

(22) PCT Filed: Feb. 20, 2019

(86) PCT No.: PCT/CA2019/050206
§ 371 (c)(1),
(2) Date: Jul. 31, 2020

(87) PCT Pub. No.: WO2019/161492
PCT Pub. Date: Aug. 29, 2019

(65) Prior Publication Data
US 2020/0354250 A1    Nov. 12, 2020

Related U.S. Application Data

(60) Provisional application No. 62/633,651, filed on Feb. 22, 2018.

(51) Int. Cl.
*C02F 11/04*    (2006.01)
*B09B 3/00*    (2022.01)
(Continued)

(52) U.S. Cl.
CPC ............... *C02F 11/04* (2013.01); *B09B 3/00* (2013.01); *C02F 11/125* (2013.01);
(Continued)

(58) Field of Classification Search
CPC .... C02F 11/04; C02F 11/125; C02F 2101/30; C02F 2303/06; C02F 2303/26;
(Continued)

(56) References Cited

U.S. PATENT DOCUMENTS

| 4,491,522 A | 1/1985 | Ishida et al. |
| 2009/0111164 A1 | 4/2009 | Schall et al. |

(Continued)

FOREIGN PATENT DOCUMENTS

| CA | 2722601 A1 * | 11/2009 |
| CN | 1074150 A | 7/1993 |

(Continued)

OTHER PUBLICATIONS

International Patent Application No. PCT/CA2019/050206, International Search Report and Written Opinion dated May 1, 2019.

(Continued)

*Primary Examiner* — Fred Prince
(74) *Attorney, Agent, or Firm* — Borden Ladner Gervais LLP; Michael Damiani

(57) ABSTRACT

Organic solid waste is pressed at a high pressure to separate the solid waste into a dry fraction and a wet fraction. The wet fraction is diluted and floatables (i.e. pieces of plastic and/or paper) in the wet fraction are comminuted. The wet fraction is then de-gritted before being sent to an anaerobic digester. Digestate is withdrawn from the digester from a free liquid surface of the digester. The digestate is filtered to extract comminuted floatables. The resulting filtrate is then composted or directly applied to land. A corresponding system comprises a press, a grinder, a hydrocyclone, an anaerobic digester, a filter and a dewaterer.

20 Claims, 3 Drawing Sheets

(51) Int. Cl.
*C02F 11/12* (2019.01)
*C02F 11/125* (2019.01)
*C02F 101/30* (2006.01)

(52) U.S. Cl.
CPC ...... *C02F 2101/30* (2013.01); *C02F 2303/06* (2013.01); *C02F 2303/26* (2013.01)

(58) Field of Classification Search
CPC .. C02F 11/126; C02F 2303/24; C02F 11/122; B09B 3/00; Y02W 30/40
USPC ....... 210/603, 609, 612, 613, 173, 252, 259, 210/608
See application file for complete search history.

(56) References Cited

U.S. PATENT DOCUMENTS

| | | | |
|---|---|---|---|
| 2009/0223902 A1* | 9/2009 | Malatesta | B01D 21/2461 210/523 |
| 2010/0267102 A1 | 10/2010 | Begin et al. | |
| 2017/0022522 A1 | 1/2017 | De Lima Vasconcellos et al. | |
| 2018/0002207 A1 | 1/2018 | Josse et al. | |

FOREIGN PATENT DOCUMENTS

| | | |
|---|---|---|
| CN | 1761621 A | 4/2006 |
| CN | 106367442 A | 2/2017 |
| EP | 2718247 A1 | 4/2014 |
| GB | 2230004 A | 10/1990 |
| WO | 2017076514 A1 | 5/2017 |
| WO | 2017156629 A1 | 9/2017 |

OTHER PUBLICATIONS

European Patent Application No. 19757409.8, Extended European Search Report dated Oct. 14, 2021.
International Patent Application No. PCT/CA2019/050206, International Preliminary Report on Patentability dated Sep. 3, 2020.
Singapore Patent Application No. SG20201108031P, Search Report and Written Opinion dated Aug. 19, 2021.
Chinese Patent Application No. 201980013844.0, Office Action dated Jul. 8, 2022—English Translation available.
Singapore Patent Application No. SG20201108031P, Search Report and Written Opinion dated Aug. 23, 2022.
Chinese Patent Application No. 201980013844.0, Office Action and Search Report dated Jan. 28, 2022—English Translation Available.

* cited by examiner

ANAEROBIC DIGESTION OF ORGANIC FRACTION OF SOLID WASTE WITH HIGH QUALITY DIGESTATE

RELATED APPLICATIONS

This application claims the benefit of U.S. Application Ser. No. 62/633,651, filed Feb. 22, 2018, which is incorporated by reference.

FIELD

This specification relates to treating solid waste, in particular systems and processes using a high-pressure press and anaerobic digestion.

BACKGROUND

US Publication 2013/0316428 describes a process in which an organic fraction containing biological cells is separated from solid urban waste. The organic fraction is extruded through a grid having small-bore holes, under a pressure higher than the burst pressure of the cell membranes. The cells are disrupted and a gel of a doughy consistency is produced. The gel is then loaded into a biodigester, where it is readily attacked by bacteria. The press may be as described in European Publication Nos. 1207040 and 1568478. In general, these presses use a plunger to compress waste that has been loaded into a cylinder. The sides of the cylinder are perforated with radial holes. US Publication 2013/0316428 and European Publication Nos. 1207040 and 1568478 are incorporated herein by reference.

INTRODUCTION TO THE INVENTION

This specification describes a process and apparatus for treating solid waste including organic matter. The waste may be, for example, municipal solid waste (MSW), an organic fraction of municipal solid waste, source-separated organics (SSO) or commercial and/or industrial waste (C&I) such as food processing or grocery waste. Mixtures of one or more of these materials may also be used. A portion of the waste is sent to an anaerobic digester to produce biogas. Digestate (digester sludge) is also produced. In principle, the digestate may be composted or applied directly to land to provide a fertilizer or other soil additive. However, various regulations limit the amount of physical contaminants (i.e. glass, metals, plastics, paper) that may be present in digestate or compost applied to land. The process and apparatus includes steps and elements useful for reducing the amount of physical contaminants in the digestate.

In a process described herein, solid waste is pressed at a high pressure, for example 50 bar or more, to separate the solid waste into a dry fraction and a wet fraction. The wet fraction is diluted and floatables (i.e. pieces of plastic and/or paper) in the wet fraction are comminuted. The wet fraction is then de-gritted before being sent to an anaerobic digester. Digestate is withdrawn from the digester, including at least some withdrawal from a free liquid surface of the digester. The digestate is filtered to extract comminuted floatables. The floatables can be disposed of. Optionally, the resulting filtrate is then dewatered to produce a cake, for example with over 18% solids content, which then can be composted or directly applied to land.

A system described herein comprises a press, a grinder, a hydrocyclone, an anaerobic digester, a filter screw press and a dewaterer. These units can be configured and/or arranged to perform the process described above.

DETAILED DESCRIPTION

Figure 1:
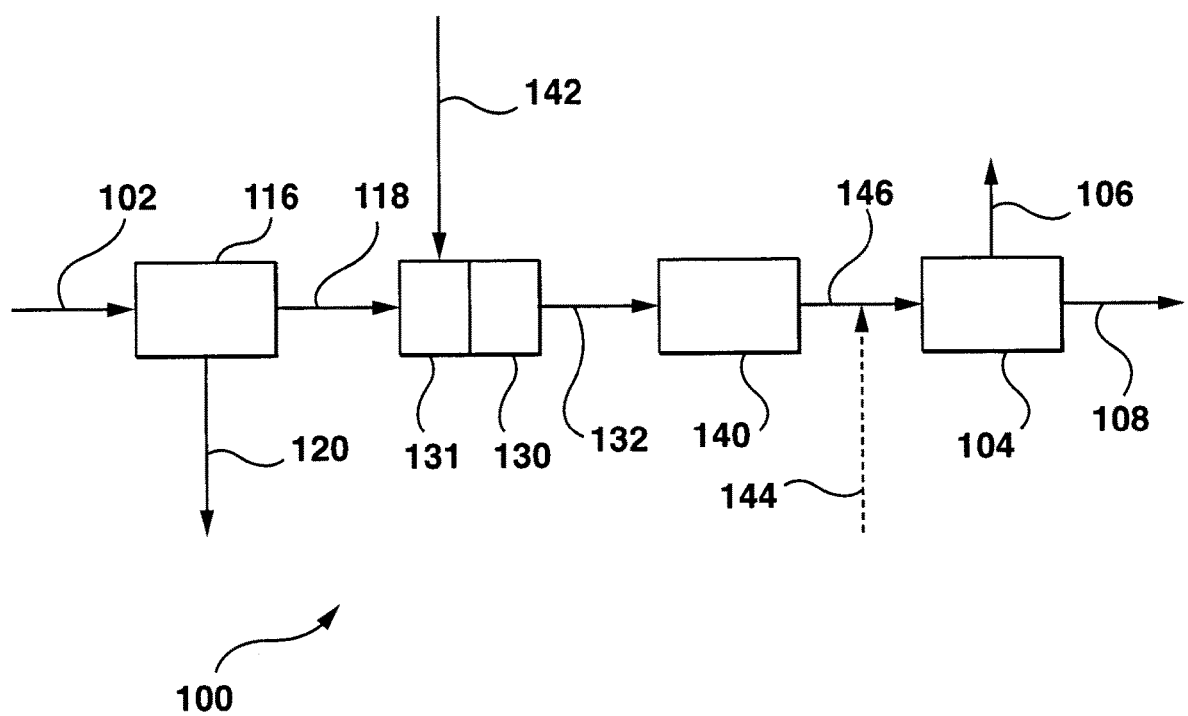
FIG. 1 is a process flow diagram of a process for treating solid waste.

Solids waste can be partly or even mostly organic but typically also includes various non-organic components and components that are non-volatile in the sense that they do not biodegrade rapidly. Household derived waste such as municipal solid waste (MSW) and source separated organics (SSO) in particular has material amounts of non-organic material such as plastic and/or non-volatile material such as paper. Processing solid waste can include various pretreatment steps depending on the source and condition of the waste. These steps can include, for example, bag opening, coarse screening, and steps to remove ferrous metals or other large or particularly valuable recyclable materials.

In a process described herein, solid waste is treated in a high-pressure press without or without pre-treatment as described above. In the press, organic material becomes flowable and is extruded from the press, while most of the non-organic material is retained in the press. The wet fraction (alternatively called organic fraction) expelled from the press is readily digestable in a wet (i.e. low solids or mixed tank) anaerobic digester, but there are some practical difficulties involved in treating the wet fraction in an anaerobic digester.

The wet fraction has a high solids content (i.e. 20 to 35% TS depending on the type of waste) and is not readily flowable. The wet fraction also typically contains a small quantity of non-organic or non-volatile contaminants such as small pieces of plastic film, paper, glass, grit, etc. These contaminants usually make up between 1 to 4% of the wet fraction on a dry basis depending on the type of waste, the type of extrusion press and type of pre-treatment.

A portion of the contaminants are floatable, meaning that even if they are more dense than water they would rise to the top of a wet anaerobic digester in the presence of gasses generated in the digester. For example, even though a press may have small holes (i.e. about 8 mm in diameter), pieces of plastic bags or paper tens of mm across may be extruded with the wet fraction. The low density of these pieces, coupled with their large surface area per unit mass, allows these pieces to be pushed to the surface of a digester by rising biogas bubbles. Waste digestate is typically pumped out from the bottom third of a digester. Since the floatable pieces reside above this layer, they tend to accumulate near the top of the digester as a floating layer. The floating layer can hinder the release of biogas and so it must be periodically broken up and eventually removed.

Another portion of the contaminants are inerts with higher specific gravity. The press generally removes inerts larger than the size of the press openings, i.e. 8 mm. However, inert particles smaller than the press openings are entrained in the wet fraction. Many of these particles do not separate from wet fraction, even if the wet fraction is temporarily stored before it is digested, due to the viscosity of the wet fraction.

However, digestion of the wet fraction converts volatile solids in the wet fraction into gasses and liquids. This reduces the solids content and viscosity of the wet fraction and inert particles will settle out and accumulate at the bottom of a wet anaerobic digester. Eventually, the digester must be drained and cleaned to remove the inerts.

Although the most volatile solids in the waste are converted to biogas, the digestate still contains undigested organic matter as well as mineral nutrients. To recover these components of the waste, the digestate can be applied to land, either directly or after a period of composting. However, the digestate must meet quality standards relating to the presence of physical contaminants. Current European Union (EU) digestate land application regulations limit contaminants (i.e. pieces of glass, metals, plastics, paper) larger than 2 mm to less than 0.5% on a dry basis. Proposed limits in the EU will reduce this limit to 0.25% on a dry basis. This applies only to SSO as the land application of digestate from the organic fraction of MSW is banned. Limits in California are currently 0.5% on a dry basis for physical contaminants larger than 4 mm. This applies to digestates from the organic fraction of MSW or SSO. However, the inventors expect the limits in California and other US states will be reduced over time following the trend in Europe.

In a system and process described herein, solid waste is pressed and digested. Inerts are removed upstream of the digester but floatable are removed downstream of the digester. Considering that most of the volatile waste input to a digester is converted to gas or liquid, the concentration of contaminants measured on a dry basis is roughly doubled or tripled in the digestate relative to the influent waste. Removing a contaminant upstream of the digester to a very low limit is therefore difficult since the limit is effectively one half or one third of the regulatory limit if applied to the influent waste, and the influent waste is in a viscous state. However, since inerts (alternatively called grit) are detrimental to the operation of the digester, they are removed upstream. The floatables, however, would require significant dilution or loss of useful organic matter to remove upstream to the anticipated standards. The floatables are instead removed downstream by way of a two step digestate treatment process. Problems are then created by the floatables in the grit removal unit and digester. These problems are addressed by comminuting the floatables, and extracting at least some of the digestate from the liquid surface of the digester. Collectively, the system and process are able to meet very rigid digestate quality standards. An exemplary system and process are shown in the Figures and will be further described below.

FIG. 1 shows a system 100 for treating a feed stream 102 of solid waste. The feed stream 102 may be, for example, municipal solid waste (MSW), MSW separated after collection to isolate an organic fraction for treatment, source-separated organics (SSO), commercial and/or industrial waste (C&I), or a mixture of one or more of these of other solid wastes. Optionally, plastics, and other non-digestable hydrocarbon materials such as wood, may be left in the waste. Metals and large pieces of mineral waste are preferably removed.

The feed stream 102 flows into a press 116. The press 116 compresses the feed 102 at high pressure through small perforations. For example, the pressure may be at least 50 bar or otherwise sufficient to rupture biological cells. The perforations may be, for example, 4 to 8 mm diameter circular holes or holes of other shapes having a similar area. The press 116 separates the feed 102 into a wet fraction 118 and a dry fraction 120. The wet fraction 118 contains organic compounds, optionally including organics contained in cells ruptured under high pressure. Preferably, 95% or more of the organics in feed stream 102 is contained in the wet fraction 118.

The dry fraction 120 may be processed further, for example to extract recyclables or cellulosic materials. Alternatively, the dry fraction 120 may be landfilled or used as refuse derived fuel (RDF).

The wet fraction 118 is sent to an anaerobic digester 104, optionally referred to as digester 104 for brevity, to produce biogas 106. The anaerobic digester 104 also produces digestate 108. Although the term digestate is sometimes used to refer specifically to a dry fraction of anaerobic digester sludge, in this specification the term digestate refers to the anaerobic digester sludge generally.

The wet fraction 118 typically has a 20-35% solids content; 20-25% from wet commercial waste or 30-35% from residential MSW. The wet fraction 118 also typically has a 85-95% volatile solids to total solids ratio. The wet fraction 118 may be 30-40% of the feed stream 102 when pressing MSW, or 70-85% of the feed stream 102 when pressing SSO.

The wet fraction 118 may be transferred from the press 116 with screw conveyors to sliding frame silos where it is stored. Wet fraction is later transferred by a screw from the bottom of the silo to a progressive cavity (PC) pump 131 with a mixing and dilution screw section. A diluent 142 is added into the PC pump 131 to reduce the solids content of the wet fraction 118, for example to 10-15%, or preferably 14-15%, so that the wet fraction 132 is pumpable and can be treated in a downstream grit removal unit 140. The diluent 142 can be digestate 108 or include digestate 108. Alternatively, other sources of dilution liquid can be used such as liquid 216 from digestate dewatering, wastewater treatment plant (WWTP) sludge 144, grit washing water 418, or a combination of one or more of digestate 108, WWTP sludge 144, grit washing water 418 and dewatering liquid 216. Diluting with digestate 108 does not reduce the solids content of the digester 104 whereas other dilutions liquids do. The dilution liquid can be selected or mixed, in combination with co-digestion if any, to help achieve a desired solids content in the digester 104, which may be for example about 4% or less, about 3% or less, or about 2.5-3%. Optionally, the digester 104 may be operated at a higher solids content, which may be beneficial for the digestion process but could also require grit, or more grit, to be filtered from digestate 108 as discussed further below.

The wet fraction 118 is pumped to a grinder. For example, an in-line grinder 130 can be installed at the discharge of the progressive cavity (PC) pump 131. The grinder 130 comminutes the pieces of plastic film and other floatables in the wet fraction 118. The size of the plastic film and other floatable contaminants is preferably reduced to a sized small enough to acceptable for a downstream grit removal process but still larger than the applicable contaminant regulation size. For example, the floatables may be ground to pieces with sizes ranging from 3-6 mm, for example 5 mm.

Although the slurry 132 may still have a high solids content, it is highly volatile and produces digestate with moderate solids content. For example, slurry 132 with 14-15% solids content could produce digestate with a solids content of only 3-6% or 4-6% if fed alone and undiluted to the digester 104. Optionally, slurry 132 may be co-digested, for example with wastewater treatment plant (WWTP) sludge 144. WWTP digesters 104 often have excess capacity and would perform better at a solids content higher than their typical 1-2%. When co-digesting, the solids content in the digester 104 can be reduced to about 4% solids or less, or about 3% solids or less, even if the slurry 132 is not otherwise diluted. Optionally, if co-digestion is not practical, a liquid other than digestate 104 can be used to dilute the wet fraction 118, which will lower the solids content in the digester 104. Although most of the grit in slurry 132 is removed from the slurry 132 before it enters the digester 104 as discussed further below, some residual grit will still enter the digester 104. When operated at a solids content of about 4% or less, or about 3% or less, most residual grit particles 2 mm in size or more will settle in the digester 104. Grit particles exceeding the European size limitation can thereby be reduced to a low concentration in digestate 108 extracted from the digester 104. In this case, digestate 108a, pumped from below the surface of the digester 104, might not need to be filtered to meet contaminant regulations. Alternatively, entrained grit over 2 mm can be filtered out of digestate 108a, for example with digestate 108b in filter screw press 104, if the digester 104 is operated at a solids content over 4%, or if required to meet contaminant concentration limits even when operating at a lower solids content.

After grinding and dilution, the slurry 132 is treated in a grit removal unit 140. The grit removal unit 140 can be a high solids hydrocyclone. The hydrocyclone removes grit, for example glass and other inerts, with specific gravity higher than, for example, 1.4. Grit extracted from the apex of the hydrocyclone has 4 to 60% solids content and is a combination of inerts and organics attached to the inerts. The grit as removed may be washed and drained in a grit washer. The wash water with organics can optionally return to the upstream PC pump for dilution. The separated grit is disposed of. Preferably, at least 85% of the grit in the slurry 132 is removed in the grit removal unit 140. Degritted feedstock 146 is sent to the digester 104.

Figure 2:
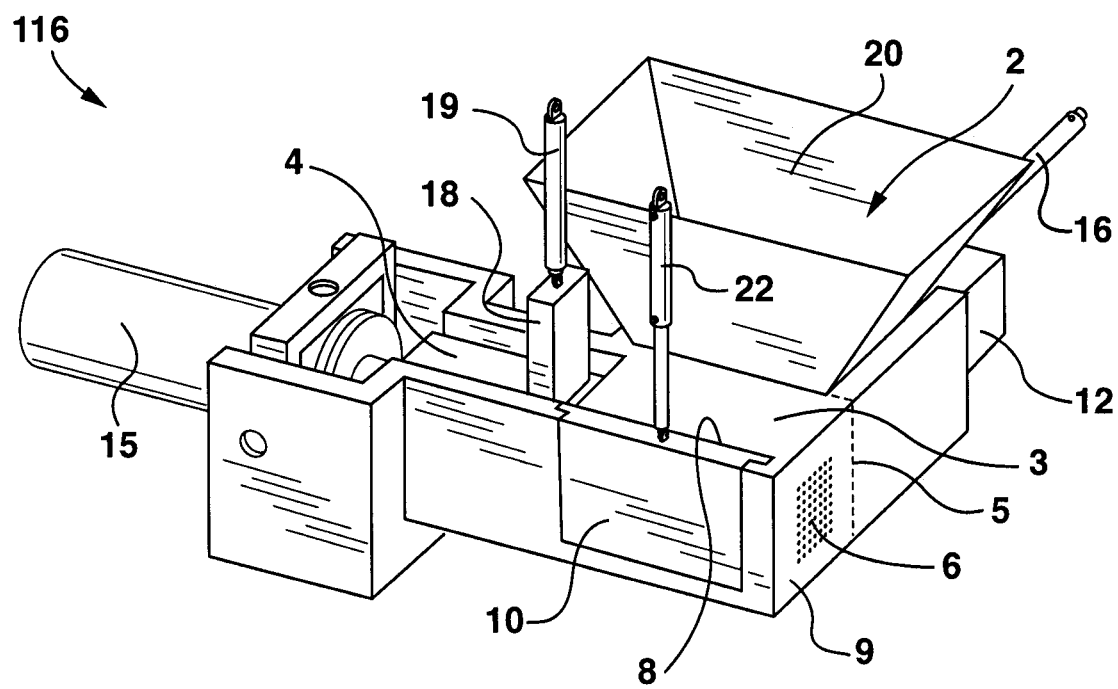
FIG. 2 is an isometric drawing of a press.

FIG. 2 shows an example of a press 116. The press 116 has a first inlet opening 2 located at the bottom of a funnel 20 for receiving the waste or organic material. Material that falls through the first inlet opening 2 can be moved through a second inlet opening 5 into a compression chamber 3 by a second piston 12. The second piston 12 moves from a retracted position outside of the first inlet opening 2 to an intermediate position at the second inlet opening 5. When in the intermediate position, the second piston 12 provides one wall of the compression chamber 3. The second piston 12 is moved by a second hydraulic cylinder 16. Preferably, pins or another mechanism (not shown) are provided to selectively lock the second piston 12 in its intermediate position.

Material in the compression chamber 3 may be compressed by a first piston 4. The compression chamber 3 has perforations 6 arranged in a wall 9 of the compression chamber 3. Optionally, perforations 6 may also be provided in, or associated with, the first piston 4. Perforations 6 allow air and a wet fraction of the material, typically containing water, and fine solids entrained in the water, to leave the compression chamber 3. A tray, not shown, collects the wet fraction.

The first piston 4 is pushed by means of a drive mechanism, for example a first hydraulic cylinder 15. The first piston 4 is movable between retracted and advanced positions. In a retracted position, as shown, the face of the first piston 4 is located just outside of the stroke of second piston 12. In an advanced position, not shown, the piston 4 is located within the compression chamber 3. As the first piston 4 moves from the retracted position towards an advanced position, it compresses sludge in the compression chamber 3. The first piston 4 may move through a pre-determined stroke selected to provide a desired pressure, or the first piston 4 may move until a pre-determined minimum pressure is indicated by a sensor.

The compression chamber 3 also has an outlet 8 for removing a dry fraction of the material from the compression chamber 3. The outlet 8 can be selectively closed by a door 10, here a sliding door driven by a third hydraulic cylinder 22. When closed, the door 10 defines a side of the compression chamber 3. After sludge has been compressed, the door 10 is raised. The second piston 12 then moves through the compression chamber 3 in a direction perpendicular to the stroke of the first piston 4 to an advanced position. In the advanced position, the face of the second piston 12 moves at least to the outside edge of door 10. This ejects a dry fraction of the sludge through the outlet 8. A conveyor belt or auger, not shown, receives the dry fraction.

To compress a volume of material, the first piston 4 and the second piston 12 are both retracted and the door 10 is closed. The volume of material is dropped into the press 116 through funnel 20 and first inlet 2. The second plunger 12 moves to its intermediate position and is locked in this position. This moves the material into the compression chamber 3. The first piston 4 then moves into the compression chamber 3. This compresses the material and separates it into a dry fraction and a wet fraction. The first piston 4 then moves back to its retracted position. Door 10 is opened. The second piston 12 is unlocked and moved to its advanced position. This ejects the dry fraction through the outlet 8. The process can then be repeated to compress another volume of material.

In the press 116 shown, the first piston 4 has perforations through its face and a plenum behind its face. These are optional features and not visible in FIG. 1. A fourth hydraulic cylinder 19 can connect to and lift a receptacle 18 from the plenum to discharge part of the wet fraction of the sludge that accumulates in the receptacle 18.

The perforations 6 preferably have a size of 10 mm or less, for example between 5 mm and 8 mm. For round perforations 6, the size is the diameter. For square perforations 6, the size is the distance between two parallel sides of the square. For perforations 6 of other shapes, the size is determined as the diameter of a circle having the same area.

The material is preferably compressed to a pressure at least sufficient to break open the cells of plants and microorganisms to release the water inside of the cells. This pressure may be about 50 bar. However, a higher pressure, up to about 280 or 300 bar may also be used and may result in higher solids content in the dry fraction.

In use, the press 116 receives feed stream 102 into the funnel 20. The material falls from the funnel 20 and is positioned in the compression chamber 3. The material is compressed and the wet fraction escapes through the perforations 6 leaving the dry fraction temporarily in the compression chamber.

The press 116 shown in FIG. 2 is further described in International Publication Number WO 2015/053617, Device and Method for Pressing Organic Material Out of Waste, which is incorporated herein by reference. A similar press is sold by DB Technologies. Another suitable press is the commercially available VM Press. Other high-pressure presses may also be used.

Figure 3:
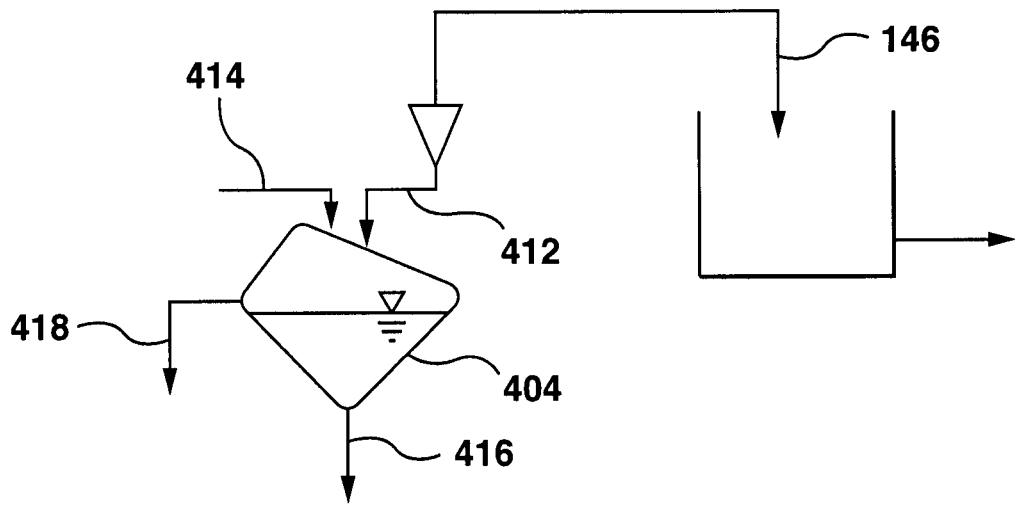
FIG. 3 is a process flow diagram for the grit removal unit in FIG. 1.
Figure 4:
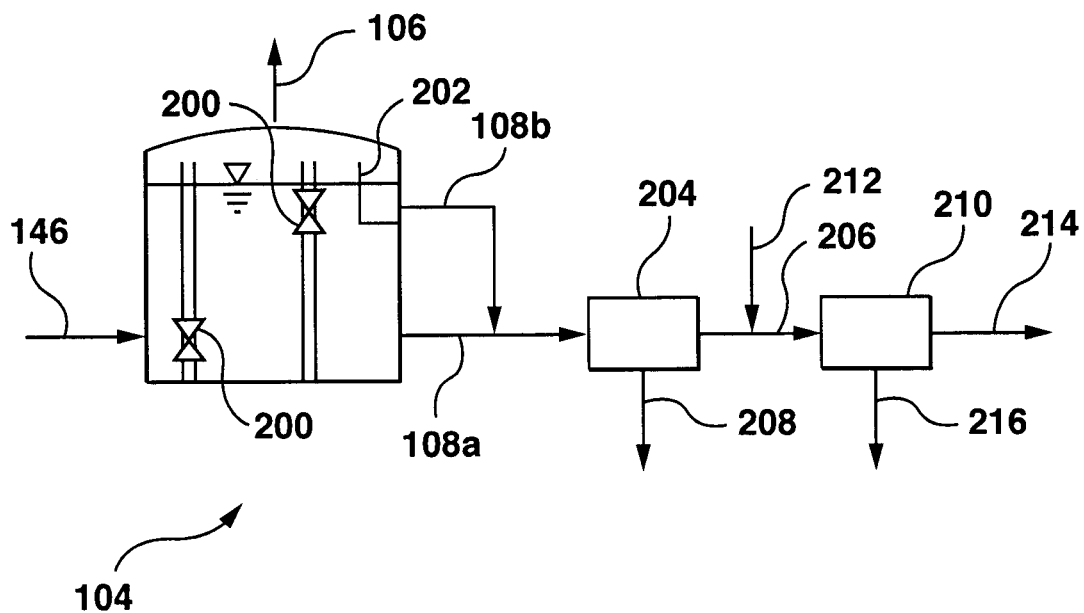
FIG. 4 shows an anaerobic digester and downstream units for the process of FIG. 1.

FIG. 3 shows an example of a grit removal unit 140. Slurry 132 is fed to the hydrocyclone 402. Grit 412 from the hydrocyclone 402 is sent to a grit washing screen 404 to be washed with water 414. Washed grit 416 may be landfilled. Wash water 418 can be wasted or re-used as dilutant 142. Degritted feedstock 146 can be fed to digester 104.

A preferred grit removal unit 140 can accept feed at up to 15% solids and will remove 90% of particles with a specific gravity of 1.4 or more that are larger than 200 microns in size from slurry 132. This leaves less grit per unit mass of dry solids than most WWTP sludge and is therefore acceptable for co-digestion in a digester 104 currently in use at a WWTP.

Degritted feedstock 146 is send to the digester 104. The digester 104 is equipped with submersible mixers 200. At least one mixer 200 is placed close to the liquid surface to break possible floating layers and crust formed by floating plastics. Digestate 108a is pumped from below the liquid surface in the digester 104. Digestate 108b is intermittently pumped from the digester 104 surface, for example using a telescopic weir valve 202. This removes portions of the floating layer and avoids plastics accumulation.

The digestate 108b, and optionally also digestate 108a, is filtered, for example in a rotary drum filter or filter screw press 104 equipped with slots or perforations configured to retain contaminants larger than, for example, 1.5 to 2 mm. The screw press produces a reject fraction 208 and a liquid fraction or filtrate 206. The reject fraction 208 is disposed of.

The filtrate 206 from the filter screw press 104 contains suspended solids smaller than 2 mm. Filtrate 206 is sent to a dewaterer 210, for example a flocculating screw press, centrifuge or other mechanical dewatering device. Polymer 212 is added to enable the suspended and colloidal solids to flocculate and be retained by the dewaterer 210. For example, polymer 212 may be injected into filtrate 206 and mixed with a high shear static mixer or mixing valve 66. The cake 214 produced has 20 to 30% solids and is used for composting or directly for land application. The cake 214 preferably meets one or more present or future physical contaminant regulation levels such as those indicated above. The liquid 216 out of the dewatering device is further treated to go to sewer or for discharge to the environment. or used for dilution water.

Filtrate 206 and dewatering liquid 216 also meets the physical contaminant requirements and can be land applied where allowed. However, application of liquids to land is not allowed in all locations. The cost of transporting liquids is also higher for a given amount of nutrient value. Accordingly, it is more likely for the cake 214 to be land applied.

Unless stated otherwise or apparent form the context, solids contents or concentrations mentioned above are dried solids (DS) measurements which would be the same as a total solids (TS) measurement. In digestate, the DS is roughly 10% higher than total suspended solids (TSS) and the total dissolved solids (TDS) is typically 2500 to 4000 mg/L (0.25 to 0.4%). For example, a 5% DS digestate may have 46,000 mg/L of TSS and 4000 mg/L TDS. Accordingly, solids contents or concentrations, unless specified otherwise, can generally be interpreted as TSS without causing a material difference in the process.

The descriptions of processes and apparatus above are to provide at least one example of an embodiment within each claim but not to limit or define any claim. However, multiple processes and apparatus have been described above and it is possible that a particular process or apparatus described above is not within a specific claim. Process parameters are given as examples of how a plant may be operated and are not meant to limit a claim unless explicitly recited in a claim. Other processes for similar applications might operate at parameters within ranges that are 50% or 100% larger in both directions than the parameter ranges described above, or within a 50% or 100% variation from a single parameter described above. If one or more elements or steps described above are used to treat other wastes or under other conditions, then one or more process ranges described above might not be suitable and would be substituted with other appropriate parameters. Words such as "may", "preferable" or "typical", or variations of them in the description above, indicate that a process step or apparatus element is possible, preferable or typical, according to the word used, but still optional and not necessarily part of any claimed invention unless explicitly included in a claim.

We claim:

1. A process comprising steps of,
   pressing solid waste to produce a wet fraction;
   comminuting floatables in the wet fraction;
   degritting the wet fraction;
   treating the wet fraction in an anaerobic digester;
   withdrawing digestate including floatables from the digester; and,
   separating comminuted floatables from digestate.

2. The process of claim 1 further comprising diluting the wet fraction before degritting the wet fraction.

3. The process of claim 2 wherein the wet fraction is diluted with digestate.

4. The process of claim 1 wherein the solid waste is pressed at a pressure of 50 bar or more.

5. The process of claim 1 comprising removing digestate from at or near a free liquid surface of the digester.

6. The process of claim 1 comprising dewatering the filtered digestate.

7. The process of claim 1 wherein the digester is operated at a solids content in the digester of about 4% DS or less or 3% DS or less.

8. The process of claim 1 wherein the wet fraction is diluted or co-digested with wastewater treatment plant sludge.

9. The process of claim 1 wherein the wet fraction is diluted to 10-15%, or 14-15% solids.

10. The process of claim 1 wherein degritting is performed with a hydrocyclone.

11. The process of claim 1 wherein the floatables are comminuted to sizes of from 3 mm to 6 mm.

12. A system comprising,
    a press;
    a grinder;
    a hydrocyclone in communication with the grinder;
    an anaerobic digester; and,
    a filter,
    wherein the grinder is located downstream of the press and upstream of the anaerobic digester.

13. The system of claim 12 further comprising a dewaterer.

14. The system of claim 12 further comprising a PC pump.

15. The system of claim 12 further comprising a positive displacement pump.

16. The system of claim 12 wherein the filter is in communication with or near the liquid surface of the digester.

17. A process comprising steps of,
    pressing solid waste to produce a wet fraction;
    comminuting floatables in the wet fraction;
    degritting the wet fraction;
    treating the wet fraction in an anaerobic digester;
    withdrawing digestate including floatables at or near a free liquid surface of the digester digester; and,
    separating comminuted floatables from digestate.

18. The process of claim 17 further comprising diluting the wet fraction before degritting the wet fraction.

19. The process of claim 17 comprising dewatering the filtered digestate.

20. The process of claim 17 wherein the wet fraction is diluted or co-digested with wastewater treatment plant sludge.

* * * * *